(12) United States Patent
Carlson et al.

(10) Patent No.: US 7,158,350 B1
(45) Date of Patent: Jan. 2, 2007

(54) GROUND INTERCONNECTS

(75) Inventors: Keith W. Carlson, Hutchinson, MN (US); Dennis A. Boismier, Shorewood, MN (US); Galen D. Houk, Hutchinson, MN (US); Larry C. Webb, Jr., Hutchinson, MN (US); Craig A. Leabch, Saint Cloud, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 399 days.

(21) Appl. No.: 10/288,395

(22) Filed: Nov. 5, 2002

(51) Int. Cl.
*G11B 5/48* (2006.01)

(52) U.S. Cl. .................................. 360/266.3

(58) Field of Classification Search ............. 360/266.3, 360/265.9, 264.2, 245.9, 245.8, 245.4, 244.7, 360/244.4, 244.3, 244.2
See application file for complete search history.

(56) References Cited

U.S. PATENT DOCUMENTS

| | | | | |
|---|---|---|---|---|
| 4,667,401 A | * | 5/1987 | Clements et al. ............. 29/832 |
| 5,068,714 A | * | 11/1991 | Seipler ........................ 257/703 |
| 5,491,597 A | | 2/1996 | Bennin et al. |
| 5,754,369 A | | 5/1998 | Balakrishnan |
| 5,781,380 A | | 7/1998 | Berding et al. |
| 5,796,552 A | | 8/1998 | Akin, Jr. et al. |
| 5,808,835 A | * | 9/1998 | Fujiwara ................. 360/244.7 |
| 5,844,750 A | | 12/1998 | Takaike |
| 5,877,919 A | * | 3/1999 | Foisy et al. .............. 360/244.6 |
| 5,961,334 A | * | 10/1999 | Inaba .......................... 439/67 |
| 6,088,235 A | | 7/2000 | Chiao et al. |
| 6,134,075 A | | 10/2000 | Bennin et al. |
| 6,631,052 B1 | * | 10/2003 | Girard et al. ............. 360/245.8 |
| 6,704,165 B1 | * | 3/2004 | Kube et al. ............... 360/245.9 |
| 6,865,058 B1 | * | 3/2005 | Kube et al. ............... 360/244.5 |
| 6,995,954 B1 | * | 2/2006 | Coon ....................... 360/245.9 |

* cited by examiner

*Primary Examiner*—Angel Castro
(74) *Attorney, Agent, or Firm*—Faegre & Benson LLP

(57) ABSTRACT

Apparatus and method for grounding a flexure of a head suspension assembly to a moving support such as an actuator arm or an E block close to a preamplifier, write driver or other wiring such as a flexible circuit located on the moving support in a disk drive assembly, including connecting a metal substrate layer of the flexure to a ground on the moving support closely adjacent the preamplifier or flexible circuit to minimize ground loop interference with signals on the traces. The invention includes a variety of arrangements to secure the metal substrate layer to the moving support.

47 Claims, 17 Drawing Sheets

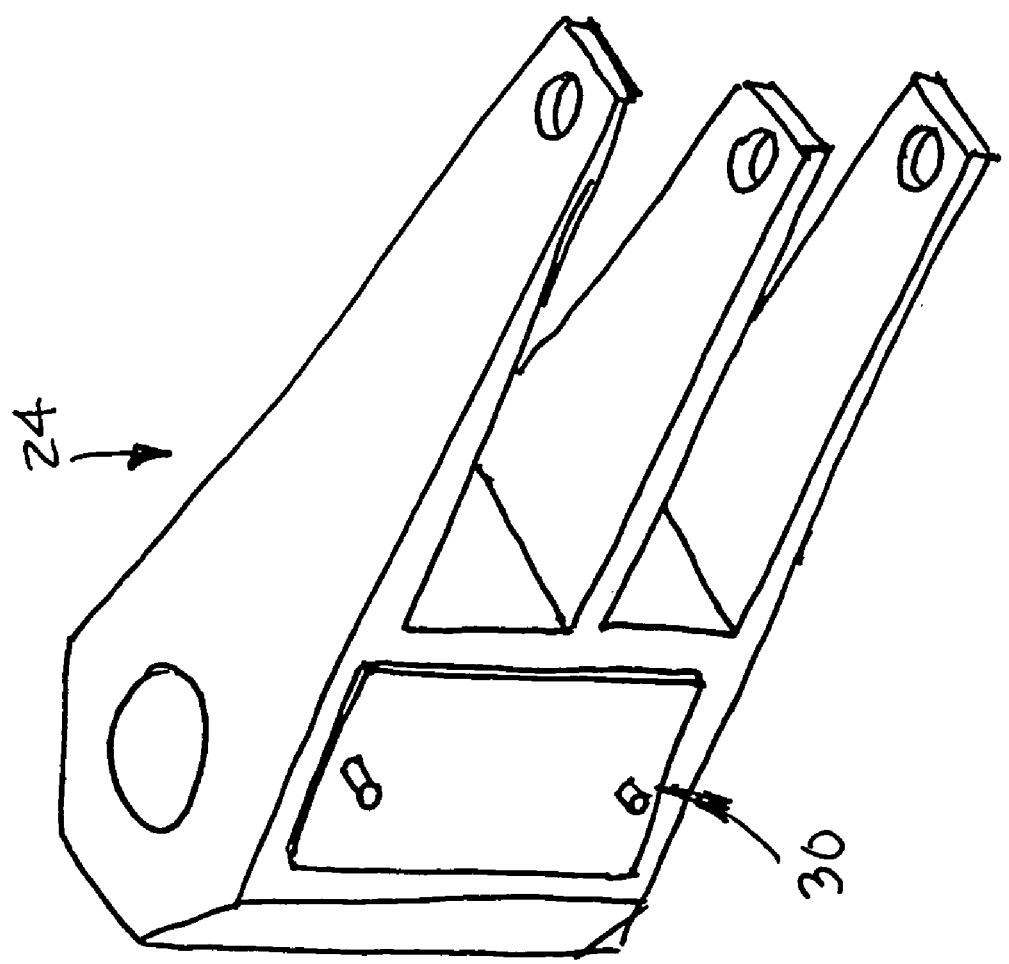

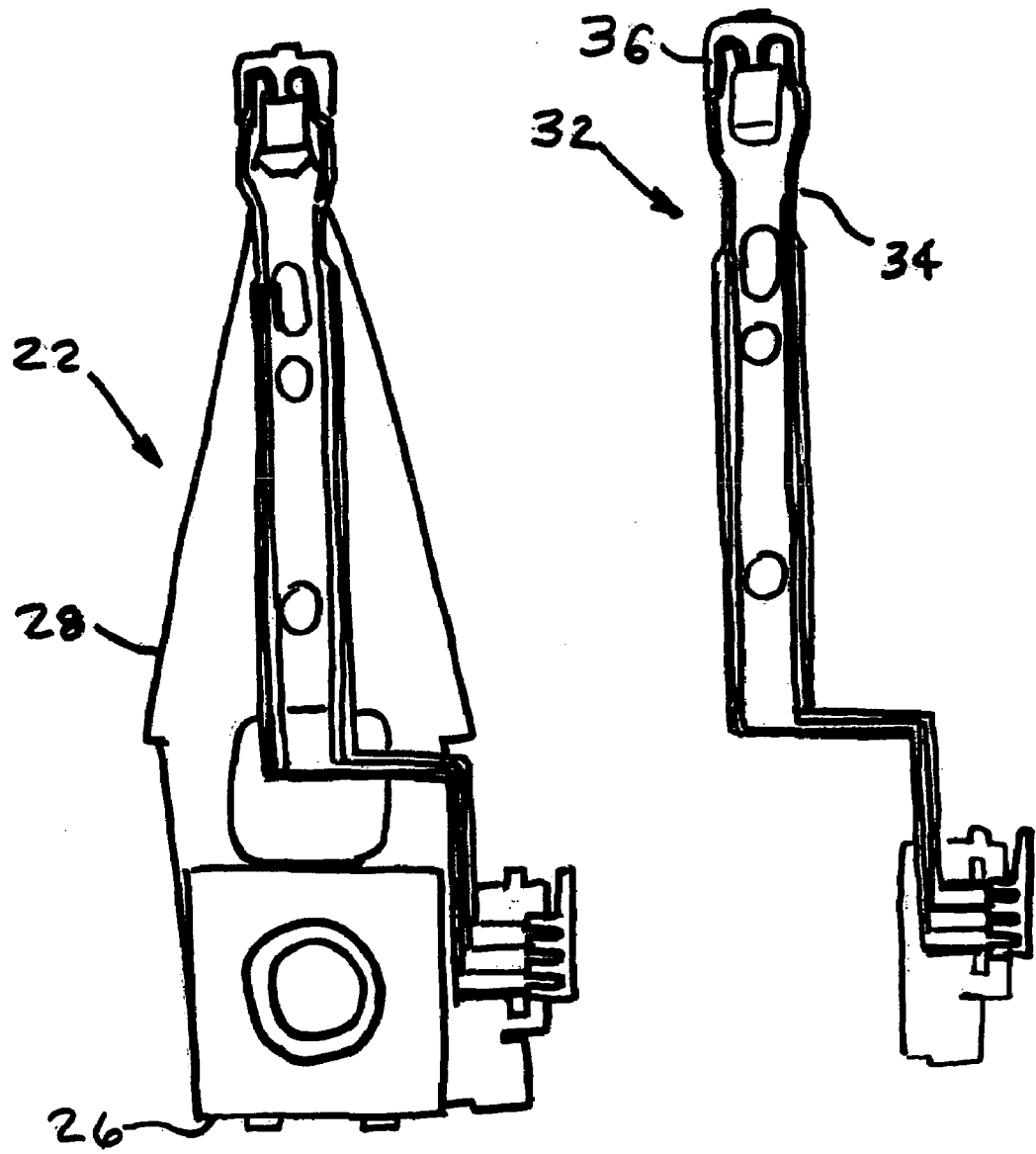
*Figure 3*  *Figure 4*

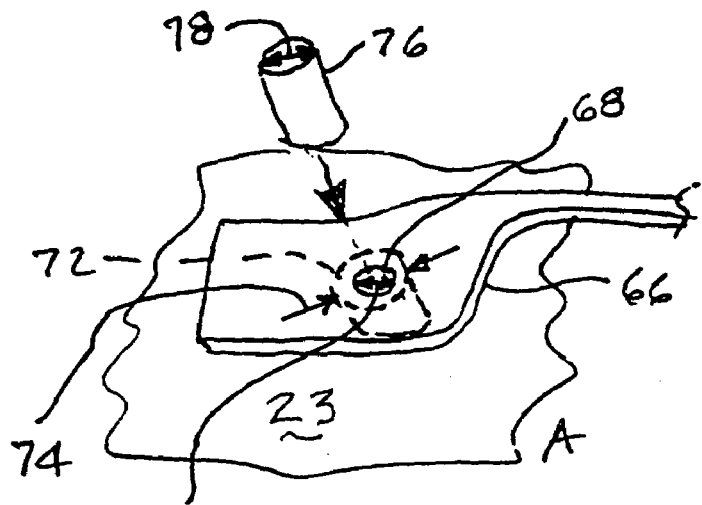
Figure 14 A
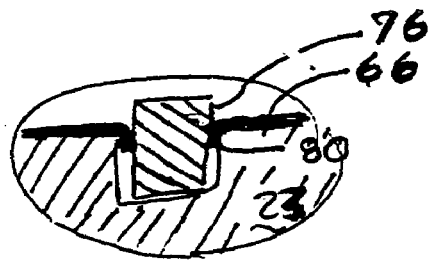
Figure 14 B
Figure 15
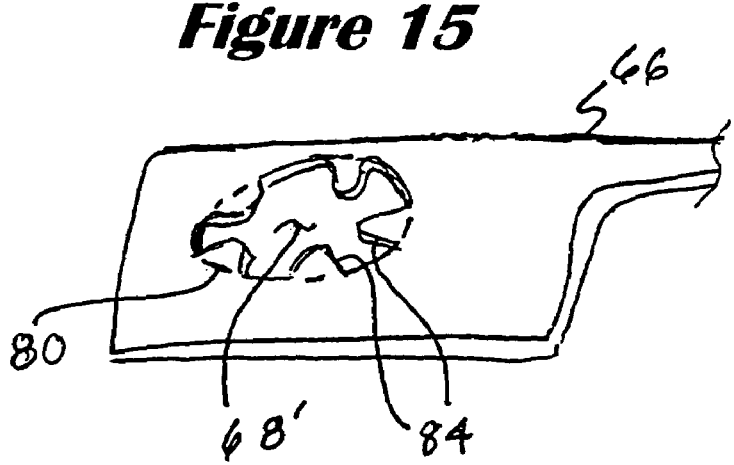

US 7,158,350 B1

GROUND INTERCONNECTS

FIELD OF THE INVENTION

The present invention relates to the field of disk drives having head suspensions, and more particularly to grounding techniques for head suspensions having integrated lead suspension assemblies.

BACKGROUND OF THE INVENTION

In the past, head suspensions for disk drives were grounded through the base plate of the head suspension assembly and the actuator arm (for single disk, single sided actuators) or an E block arm (for a multiple disk actuator or a two-sided single disk actuator) on which the base plate was mounted. Such an arrangement has been found to form a rather large inductive loop, characteristically sensitive to noise and susceptible to crosstalk, or unwanted coupling of signals from one trace pair to another. The inductive loop was a result of the separated locations of the ground at the baseplate and the ground at the preamplifier, typically located on the actuator arm or E block arm. The present invention overcomes shortcomings of this aspect of the prior art.

BRIEF DESCRIPTION OF THE DRAWINGS

FIG. 2A is a simplified perspective view of a prior art E block illustrating grounding of the head suspension through a baseplate and grounding of a preamp through pins to the E block.

FIG. 3 is a plan view of a head suspension assembly having a flexure located thereon.

FIG. 4 is a plan view of the flexure from FIG. 3.

FIG. 14A is a fragmentary exploded perspective view of a pin capture of the flexure in a sixth embodiment of the present invention.

FIG. 14B is a fragmentary side section view of a pin and support structure capturing the flexure according to the sixth embodiment of the present invention.

FIG. 15 is a perspective view of an alternative flexure arrangement showing a variation of the sixth embodiment of the present invention.

DETAILED DESCRIPTION

Figure 1:
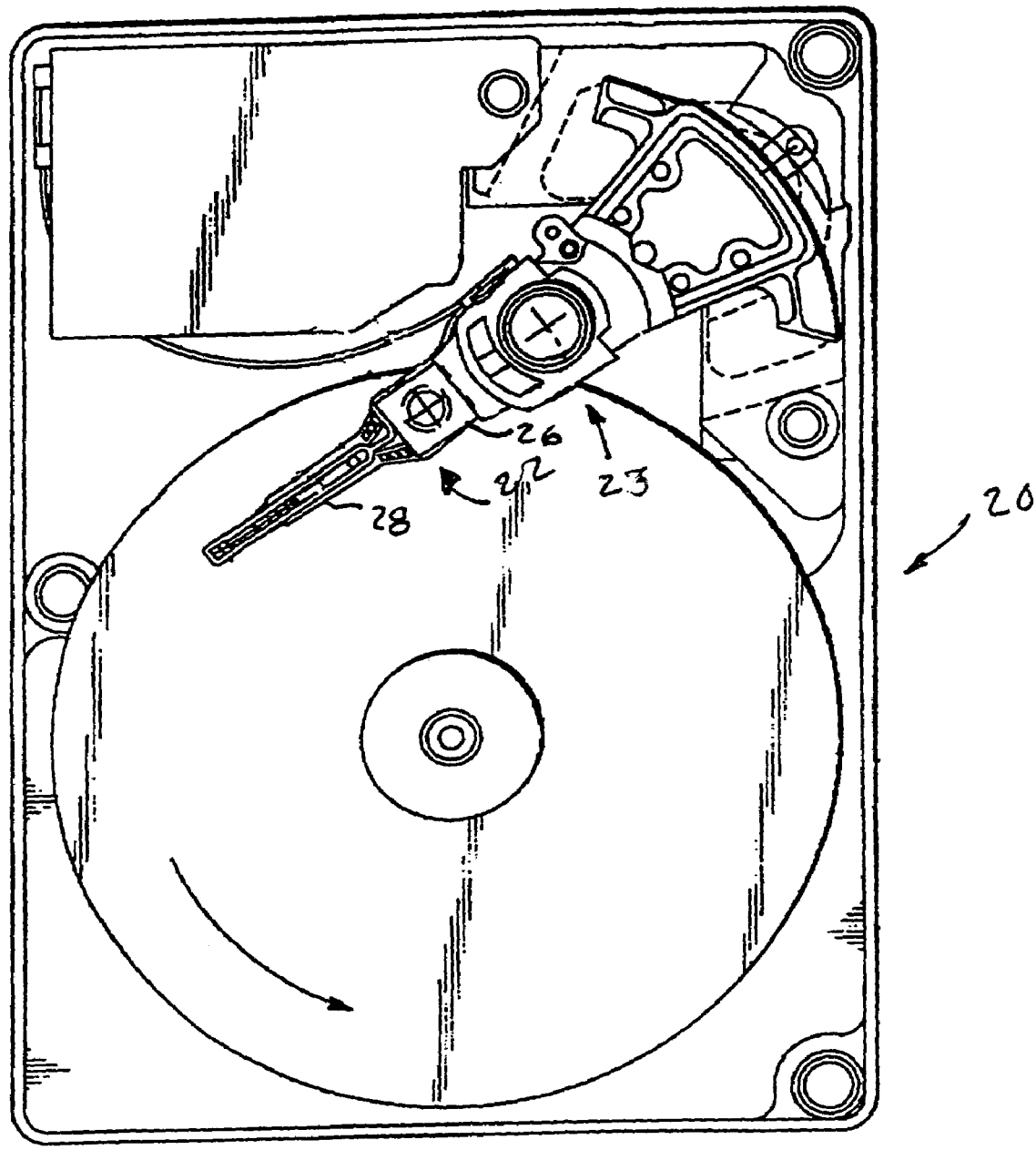
FIG. 1 is a top view of a disk drive and head suspension of the type to which the present invention is directed.
Figure 2B:
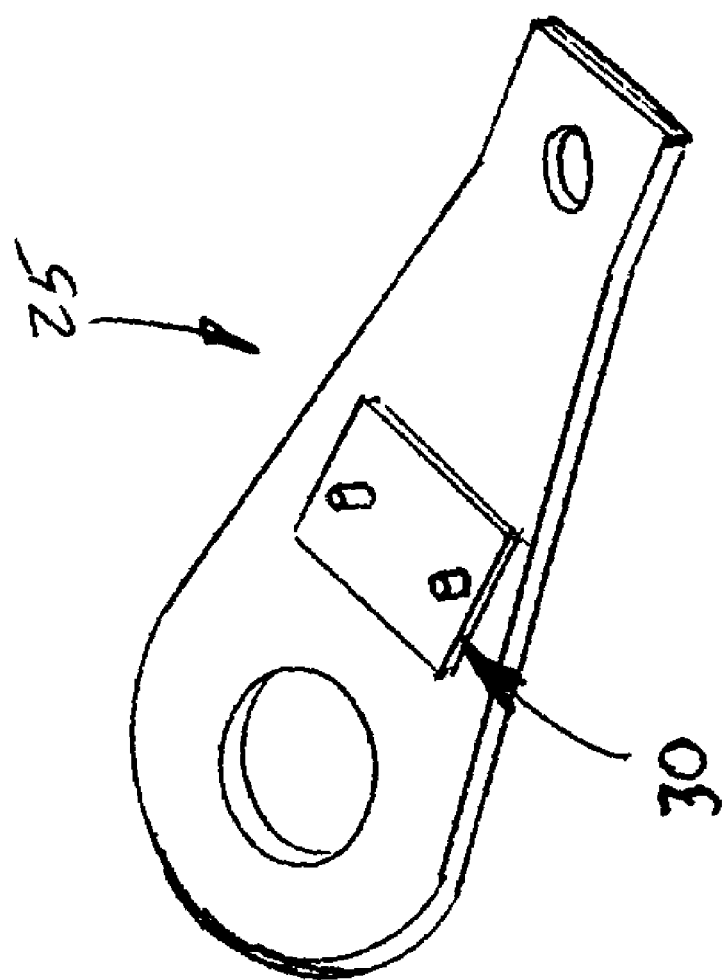
FIG. 2B is a simplified perspective view of a prior art actuator arm for a single disk, single sided actuator useful in the practice of the present invention.
Figure 5A:
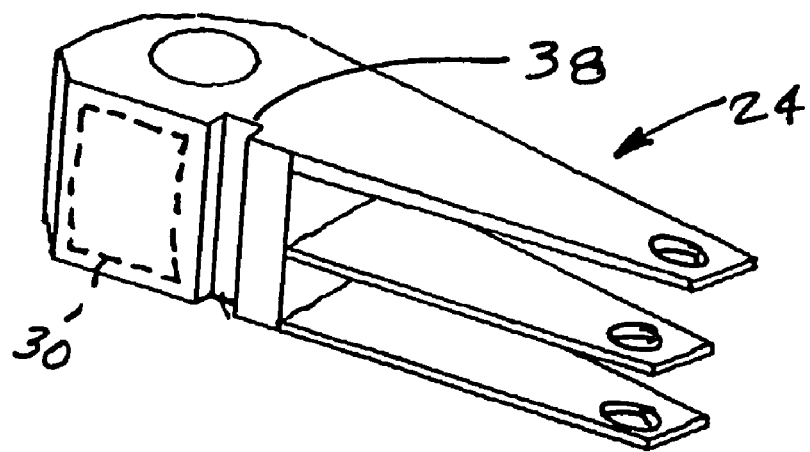
FIG. 5A is a simplified perspective view of an E block showing a groove useful in a first embodiment of the present invention.
Figure 6:
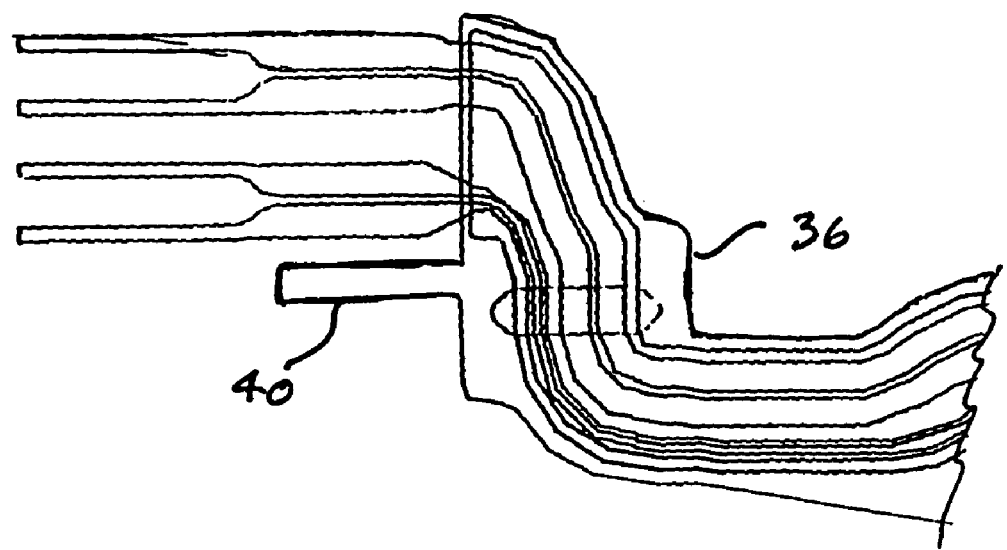
FIG. 6 is a fragmentary plan view of a flexure showing a finger extending from a stainless steel layer useful in the practice of the first embodiment of the present invention.
Figure 5B:
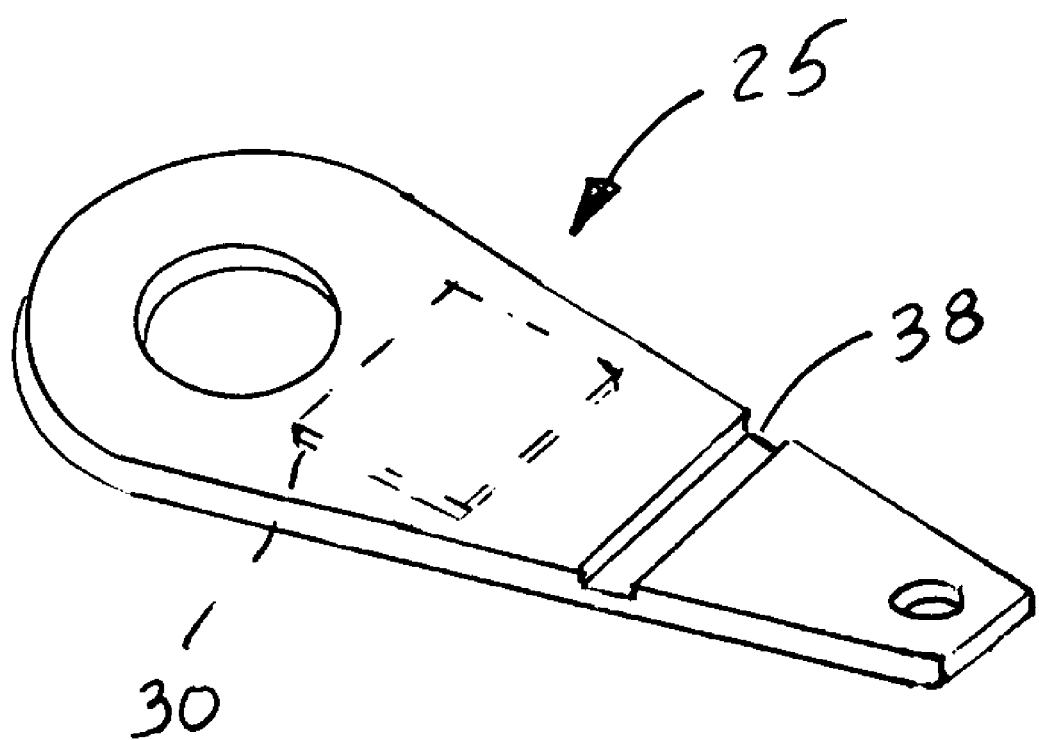
FIG. 5B is a simplified perspective view of an actuator arm for a single disk, single sided actuator useful in the practice of the present invention.
Figure 7A:
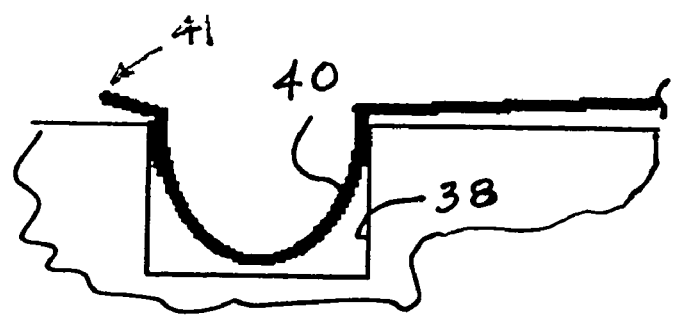
FIG. 7A is a simplified fragmentary cross section view of the finger of FIG. 6 installed in the slot of FIG. 5A or FIG. 5B.
Figure 7B:
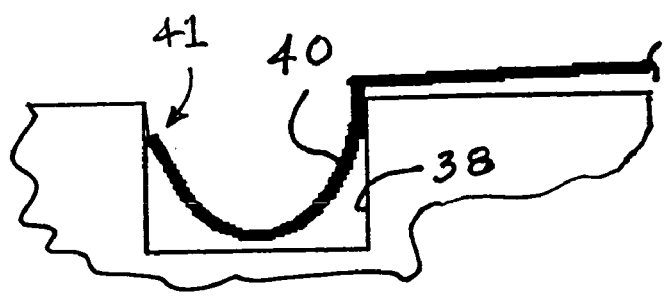
FIG. 7B is a view similar to that of FIG. 7A, except with a distal end of the finger captured in the slot.
Figure 7C:
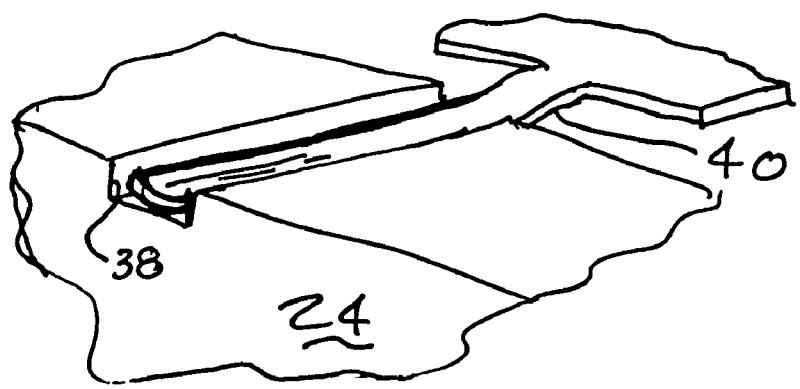
FIG. 7C is an alternative arrangement for the finger and slot of FIGS. 5A, 5B and 6.

Referring to the Figures, and most particularly, to FIG. 1, disk drive 20 may be seen. Drive 20 typically includes one or more head suspension assemblies 22, each of which are mounted on a moving support 23. When only one head suspension is present, the moving support 23 is an actuator arm 25 (see FIG. 2B). When more than one head suspension assembly is present, they are typically mounted on an E block 24, a simplified perspective view of which may be seen in FIG. 2A. As used herein, it is to be understood that "moving support 23" is generic to both the actuator arm 25 and the E block 24. Each head suspension assembly 22 is mechanically secured to the moving support 23 (i.e., an actuator arm 25 or an E block 24) by a base plate 26. The base plate, typically being metal, as is a load beam 28 of the head suspension assembly 22, will provide a ground path to the moving support 23, which is also typically metal. The ground path through the base plate, however, is subject to variability in that common mode current may take a tortuous path returning from the write head and outside of the suspension interconnect. Such ground currents have been observed as a result of timing skew and level mismatch in the write driver circuit located in a preamplifier or "preamp" 30, typically mounted to the actuator arm 25. Alternatively, a plurality of preamps (which may be combined in a single circuit board or assembly 30) are typically mounted to the E block 24, in either case with the preamp or preamps grounded to the moving support 23 physically close to the preamps.

The present invention overcomes shortcomings of the prior art by providing an apparatus for reducing ground loop interference in a head suspension assembly by providing a ground connection for the head suspension relatively physically close to the preamplifier (or other wiring) mounted on the moving support, whether it is an actuator arm or an E block. The present invention takes advantage of construction of the head suspension assembly 22, which includes a flexure 32, (see FIGS. 3 and 4). The flexure 32 includes a set of traces or conductors 34, preferably made of copper or a copper alloy, an insulator layer at least coextensive with the traces 34, preferably formed of a polyimide, and a metal substrate layer 36, preferably formed of stainless steel. The flexure is typically a three layer laminate when made using a subtractive process. Using an additive process may result in a laminate having three layers or more than three layers. The invention includes a first ground connection on the moving support closely adjacent the preamplifier (or other wiring at that location, e.g., a write driver separate from the preamplifier) and a second ground connection formed in the metal substrate layer, with the first and second ground connections mechanically and electrically connected together in close proximity using various alternative embodiments. The close proximity of the first and second ground connections avoids the relatively large physical size of the ground loop present in prior art arrangements. It is to be understood that the moving support referred to herein is either formed of a conductive material or has a portion in which the second ground connection is formed of conductive material. Typically the moving support is metal, usually aluminum.

Referring now most particularly to FIGS. 5A, 5B, 6, and 7 a slot 38 is formed in the moving support 23 (either E block 24 or actuator arm 25) in a first embodiment. In a first variation, shown in FIG. 7A, a finger 40 is formed in the metal layer 36, positioned so as to be aligned transverse to the slot 38 when the head suspension assembly 22 is mounted on the E block 24. In the embodiment shown in FIG. 7A, a distal end 41 of the finger 40 projects out of the slot 38. In a second variation, shown in FIG. 7B, the distal end 41 of the finger 40 is captured in the slot 38. In a third variation, shown in FIG. 7C, the finger 40 is aligned longitudinally with the slot 38. To complete assembly of any of the variations of this embodiment, finger 40 is urged into slot 38 and is retained in mechanical and electrical contact therein by the resilient spring characteristics of the material of layer 36.

Figure 8:
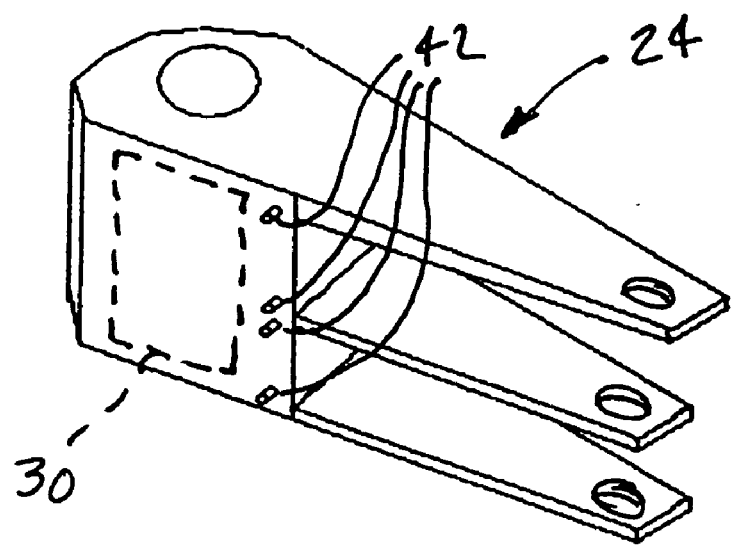
FIG. 8 is a simplified perspective view of an E block showing press pins useful in a second embodiment of the present invention.
Figure 9:
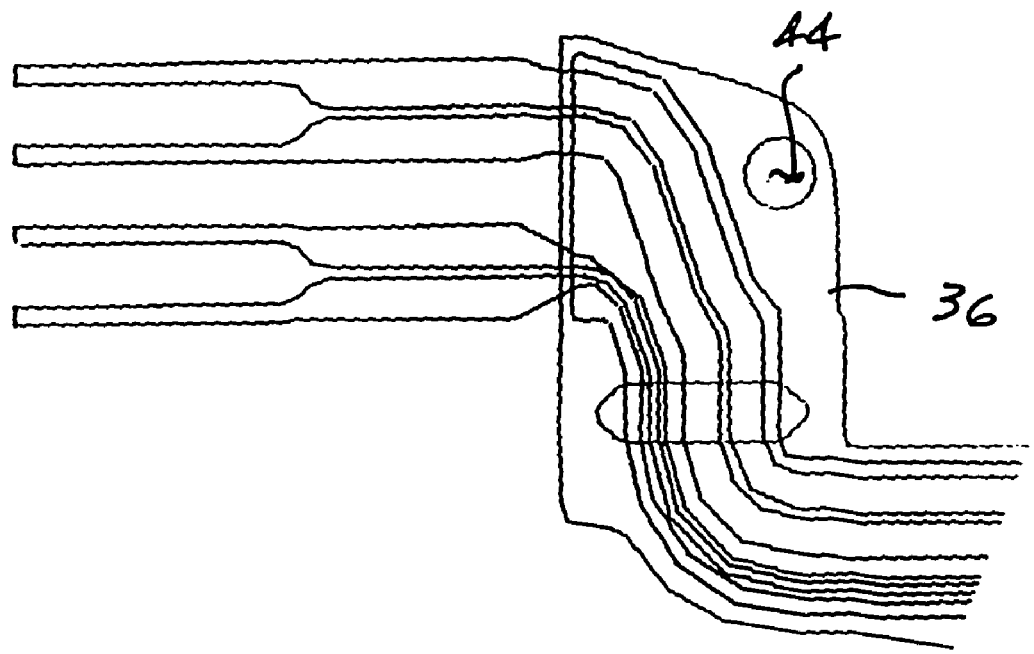
FIG. 9 is a fragmentary plan view of a flexure showing a region of the stainless steel layer having an aperture therein useful in the practice of the second embodiment of the present invention.
Figure 10:
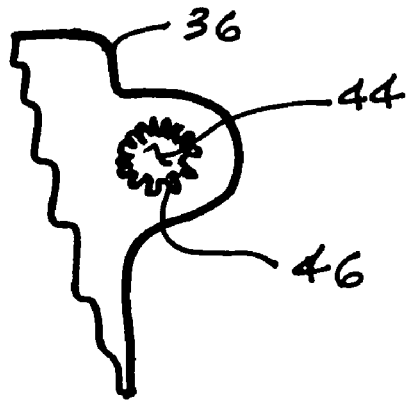
FIG. 10 is a fragmentary plan view of an alternative aperture in the stainless steel layer useful in the practice of the second embodiment of the present invention.

Referring now most particularly to FIGS. 8, 9 and 10, a second embodiment has one or more press pins 42 extending from the E block 24 adjacent the preamp or other wiring location 30. In this embodiment, the metal layer 36 has one or more apertures 44 sized to have an interference fit with respective ones of pins 42, such that the aperture 44 may be forced over pin 42, resulting in a good mechanical and electrical bond therebetween. As shown in FIG. 9, the aperture 44 may be circular, it being understood that the aperture is sized to have an interference fit with pin 42. As shown in FIG. 10, as a variation of this embodiment, aperture 44 may have a plurality of radially inwardly directed projections 46 to assist in forming a mechanical and electrical connection between the metal layer 36 and the pin 42 over which aperture 44 is received. In each of the variations shown for this embodiment, it is to be understood that the E block may be replaced by an actuator arm.

Figure 11:
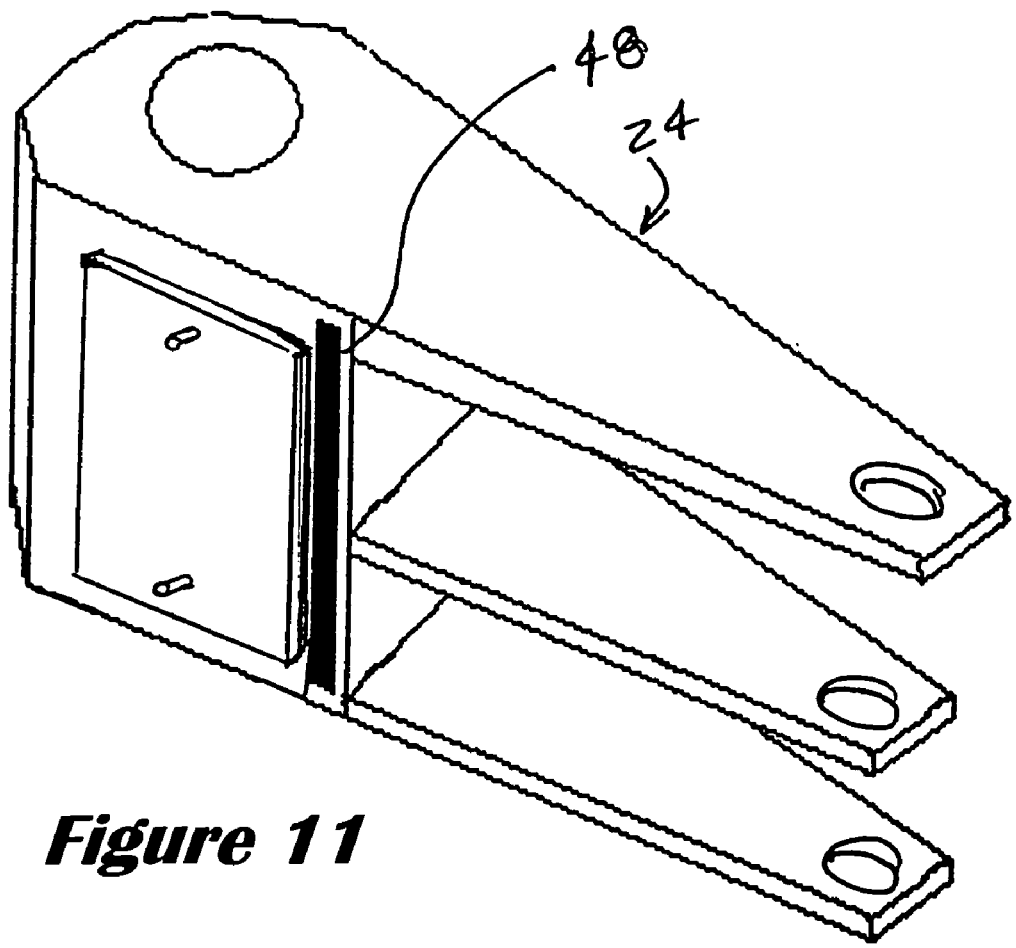
FIG. 11 is a simplified perspective view of an E block showing a preamp circuit board mounted thereon and showing a conductive tape useful in a third embodiment of the present invention.

Referring now to FIG. 11, a third embodiment of the present invention uses a conductive adhesive which may be in the form of a strip or film 48 to mechanically and electrically connect the metal layer 36 with the E block 24. Similarly, a conductive adhesive may be applied to an actuator arm instead of the E block. In this embodiment, the strip 48 is attached to a metal surface of the E block 24 closely adjacent the location 30 of the preamplifier or a write driver, if separate from the preamplifier. Preferably, a release layer (not shown) is then removed from the strip 48. The metal layer 36 of the tail of the flexure 32 is then urged against the strip 48, forming a ground connection circumscribing a minimal area to reduce ground loop interference.

Figure 12:
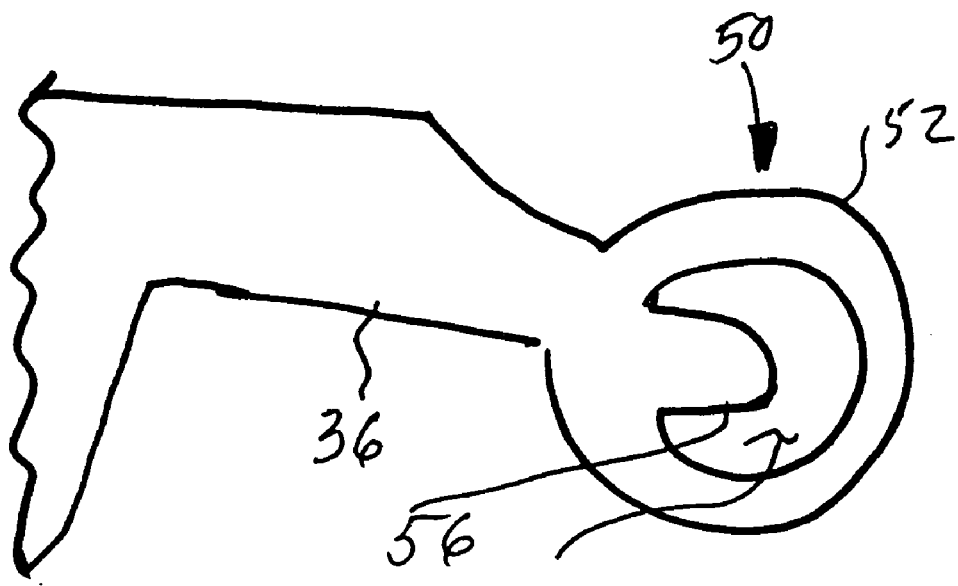
FIG. 12 is a fragmentary plan view of a flexure showing a region of the stainless steel layer having a solder connection feature useful in the practice of a fourth embodiment of the present invention.

Referring now to FIG. 12, a fourth embodiment of the present invention uses a solder connection 50, preferably formed as a ring 52 circumscribing an aperture 54 having a finger 56 projecting laterally thereinto. In this embodiment, the solder connection 50 forms an electrical connection to the metal layer 36 by way of a solder joint to the preamp 30 or other solderable electrical circuitry or wiring mechanically close to the preamp 30. Preferably, an activated flux is used to provide good wetting of the metal layer 36 from which the solder connection 50 is formed. Alternatively, the solder connection may be plated with a more readily solderable material, to enhance the soldering process. The solder connection is preferably soldered as close as possible to the preamplifier to minimize the ground loop effect. The solder connection may be connected to a point on a printed circuit board carrying the preamplifier, or it may be soldered to a flex circuit or other wiring physically closely connected to the preamplifier, whether the preamplifier is on an actuator arm or an E block.

Figure 13:
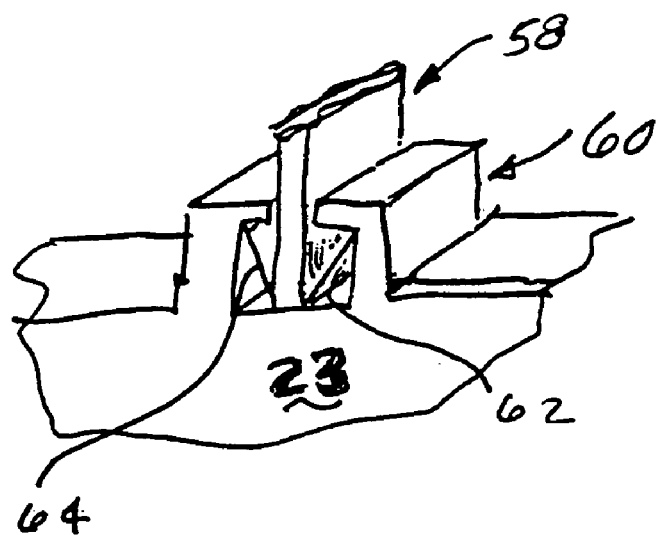
FIG. 13 is a fragmentary perspective view of a movable support and a flexure showing a spring capture for the flexure in a fifth embodiment of the present invention.

Referring now to FIG. 13, a fifth embodiment may be seen. In this embodiment, a flexure assembly 58 is received in a retention feature 60 machined into the movable support 23. It is to be understood that there are two flexures 32 arranged back-to-back to make up assembly 58. One flexure is the "up" suspension, and the other flexure in the back-to-back assembly is for the "down" suspension. A first wing 62 formed as a first conductive layer of the flexure assembly 58 and a second wing formed as a second layer of the flexure assembly 58 (preferably using the conductive layers of the respective flexures 32 making up flexure assembly 58) each are arranged to resiliently spread outward away from each other, acting as springs to electrically connect the flexure to the movable support 23 at least through the first conductive layer 60, which is preferably a stainless steel layer of the flexure, and which further preferably forms a ground connection between the flexure 32 and the movable support 23 closely adjacent the preamplifier (not shown in this view). The fifth embodiment may thus be seen to include a partially closed cavity in the movable support 23 and wherein the metal substrate layer is bent to form a spring like member received and retained in the cavity. As with other embodiments, the movable support 23 can be either an E block or an actuator arm.

FIGS. 14A and 14B show a sixth embodiment of the present invention wherein a flexure ground layer 66, preferably formed of stainless steel, has a hole 68 therein, with a diameter 70. Movable support 23 has a hole 72 therein, with a slightly larger diameter 74 than diameter 70 of flexure hole 68. It is to be understood that hole 72 may be formed as a blind bore. Both the hole or aperture 68 and the bore 72 preferably have circular cross sections. A pin 76 having a diameter 78 greater than diameter 70 and less than diameter 74 is pressed against layer 66 forcing a portion of the layer 66 surrounding hole 68 down into bore 72, trapping a peripheral edge 80 of layer 66 against the interior of bore 72, thus making electrical and mechanical connection between layer 66 and movable support 23, as shown most clearly in FIG. 14B. In other words, in this embodiment the opening 72 in the movable support receives the pin 76 which deforms the rim 80 of the aperture 68 in the metal substrate layer and urges it against the opening 72 in the movable support.

Referring now to FIG. 15, a variation of the sixth embodiment has a hole 68' in flexure 66 with a plurality of radially inwardly directed tongues 84 projecting inwardly from the peripheral edge or rim 80 of hole 68'. In this variation, the tongues 84 are captured by pin 76 in bore 72 of the movable support 23, and in the process, are deformed and retained by the pin 76 against the bore 72.

Figure 16:
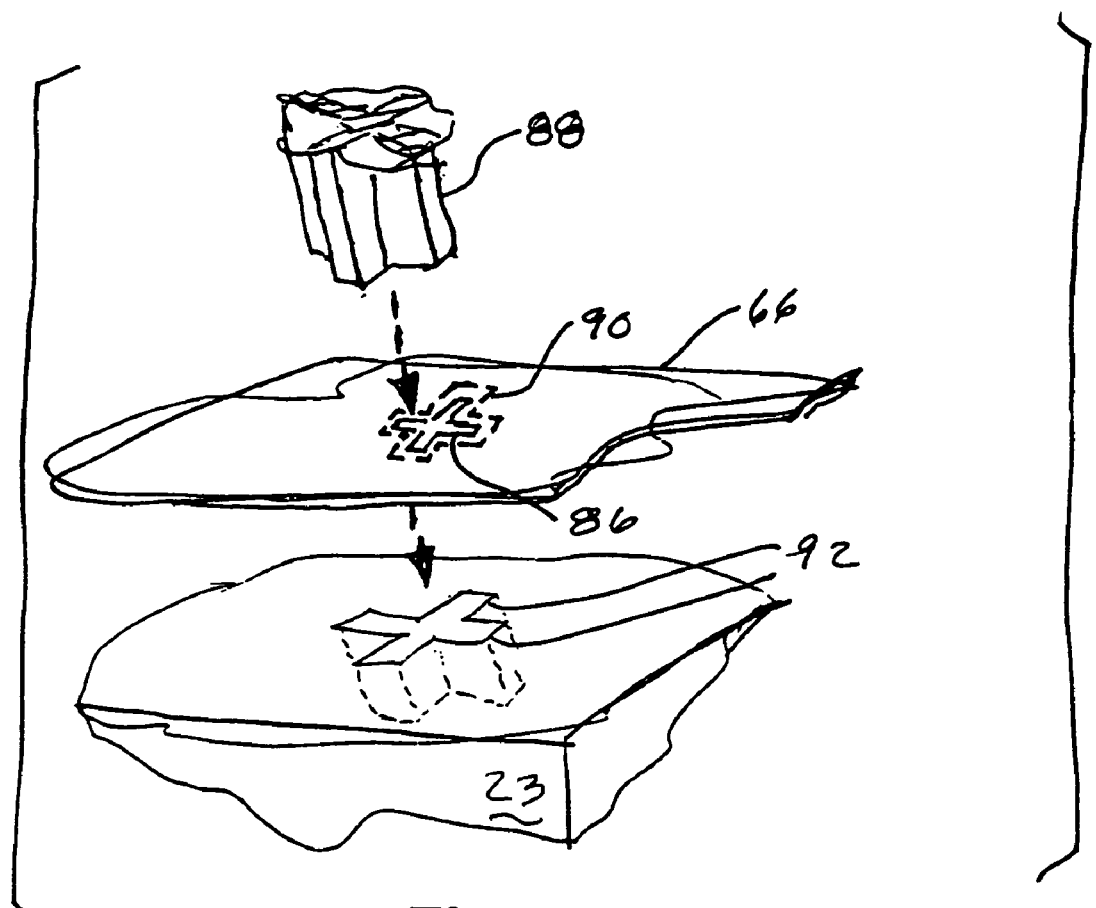
FIG. 16 is an exploded fragmentary perspective view of a punch, flexure and support structure useful in the practice of a seventh embodiment of the present invention.

Referring now to FIG. 16, a seventh embodiment of the present invention may be seen. In this embodiment, the flexure 66 may have an etched feature 86 or it may be blank. A punch 88 is used to force a peripheral region 90 surrounding the feature 86 into corresponding slots 92 machined into the support structure 23. In this embodiment, the first ground connection is formed by an opening formed as at least one slot 92 (but preferably having a cruciform cross section), and the second ground connection is formed by the punch 88 either creating or moving against the aperture 86, resulting in one or more tongues which thereafter extend into slot(s) 92.

Figure 17:
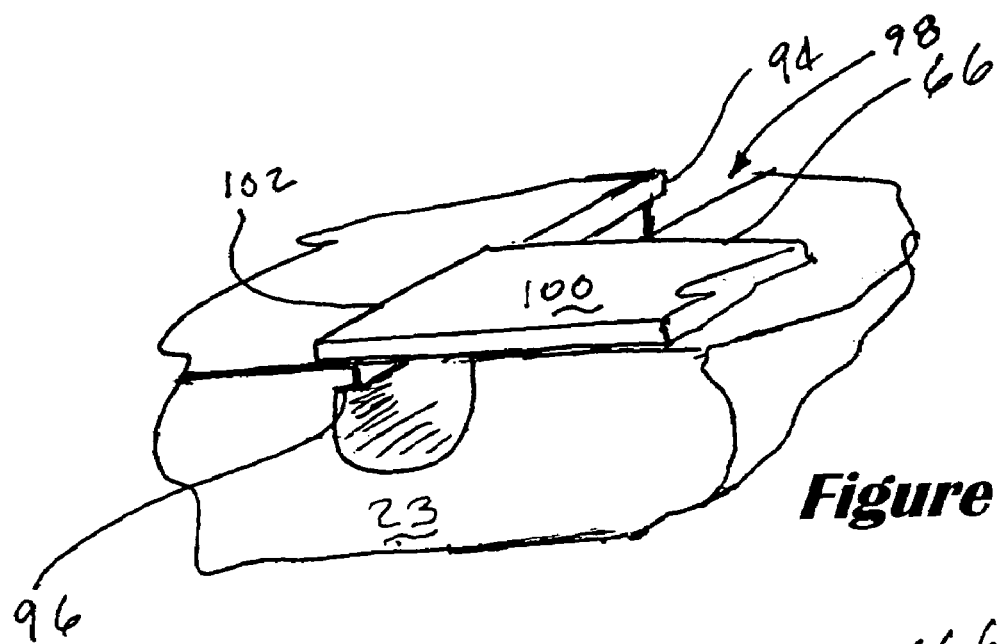
FIG. 17 is a fragmentary perspective view of a flexure and support structure useful in a ninth embodiment of the present invention, showing the parts arranged just before installation.

Referring now to FIG. 17, a ninth embodiment of the present invention may be seen. In this embodiment, the structure 23 has an overhanging portion 94 forming a lip 96 at an edge of a recess or slot 98. A finger 100 having an edge 102 formed on an end of the flexure 66 is initially positioned above the slot or trough shaped opening 98, and then forced down into the slot until the edge 102 of the finger 100 is captured and retained by lip 96.

Figure 18:
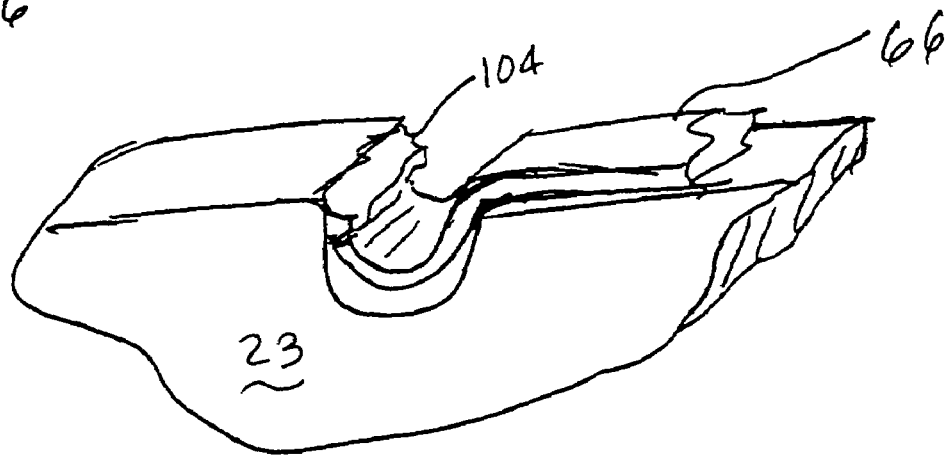
FIG. 18 is a perspective view of the flexure installed in the support structure in a variation of the ninth embodiment of the present invention.

The embodiment shown in FIG. 17 may be modified as shown in FIG. 18, wherein the overhanging portion 94 is changed to a deformed state 104 by melting the overhanging portion 94 or mechanically pushing portion 94 downward. Alternatively, a deformed overhang may be accomplished by moving an upper edge part of a wall of the slot 98 without an initial overhang.

Figure 19:
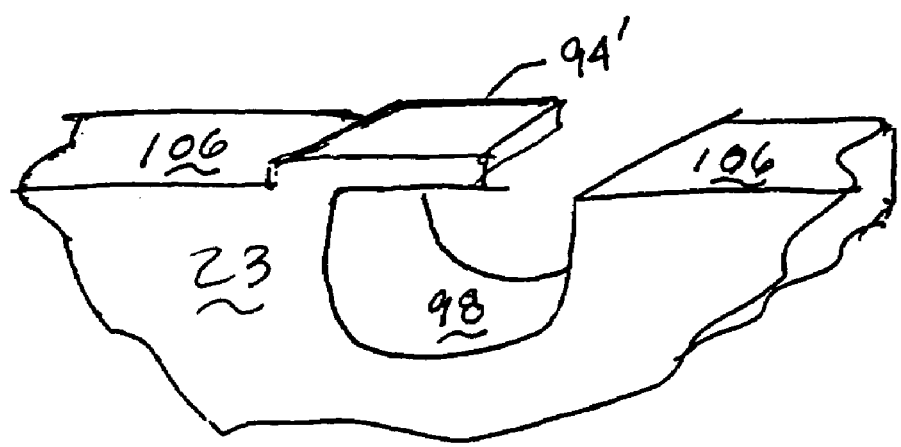
FIG. 19 is a fragmentary perspective view of the support structure in a further variation of the ninth embodiment of the present invention.
Figure 20:
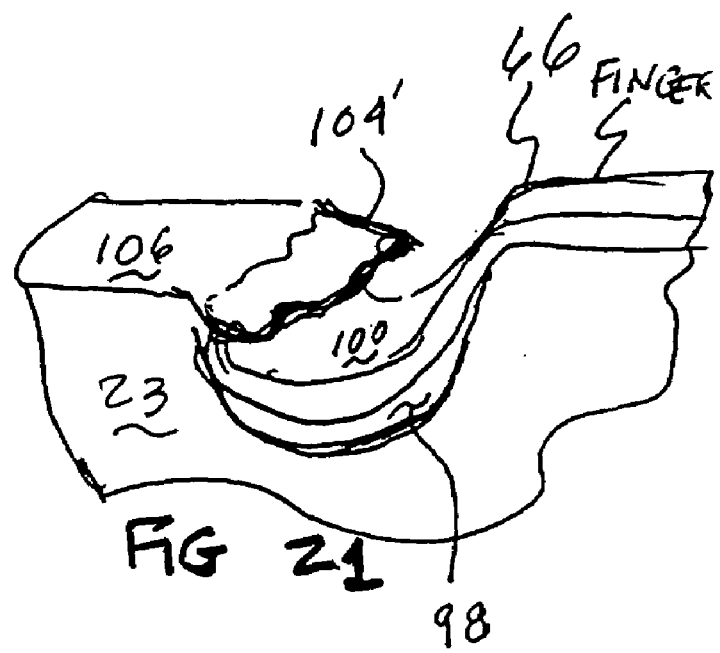
FIG. 20 is a perspective view corresponding to that of FIG. 20, except with the flexure installed and an overhanging portion deformed to retain the flexure.

Referring now to FIGS. 19 and 20, another variation on the ninth embodiment may be seen. In this variation, an overhanging portion 94' is initially formed above a surface 106 into which the slot 98 projects. In FIG. 20, the portion 94' is deformed by thermal or mechanical means to provide a structure to retain finger 100 in slot 98, thus mechanically and electrically connecting the flexure 66 to the movable support 23 in the ninth embodiment in each of its variations. As may be noted by comparison of FIGS. 17 and 19, the initial overhang may be formed either above or below the upper planar surface 106 of the support structure 23.

Figure 21:
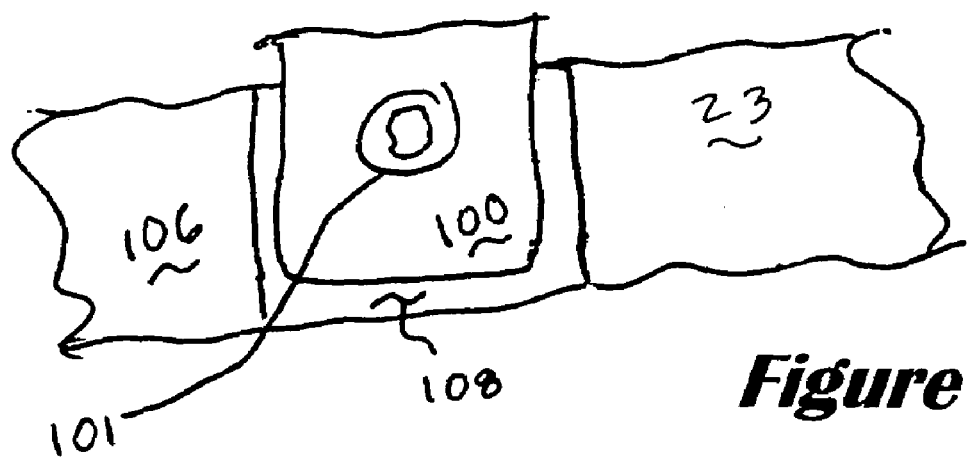
FIG. 21 is top plan view of a flexure finger juxtaposed to a portion of a movable support in a tenth embodiment of the present invention wherein the finger is melted to bond to the support.
Figure 22:
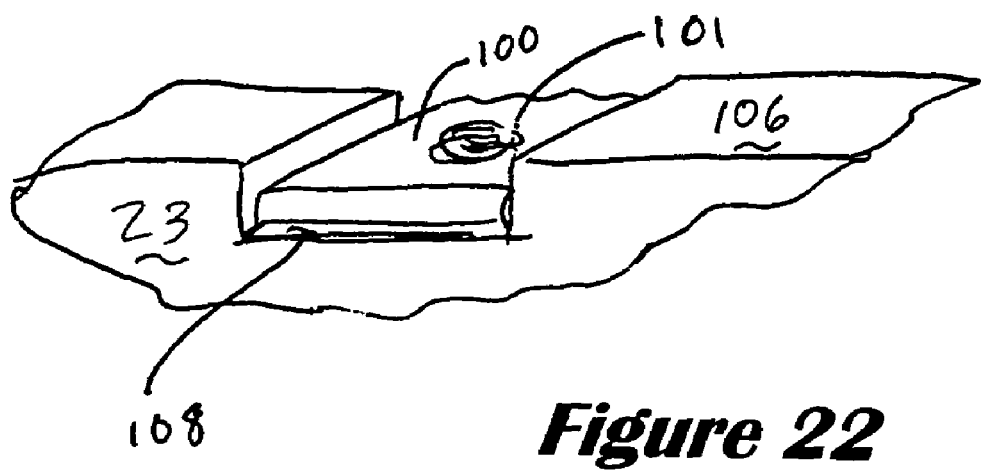
FIG. 22 is a perspective view of the tenth embodiment of the present invention shown in FIG. 21.

Referring now to FIGS. 21 and 22, a tenth embodiment illustrates the finger 100 of the flexure (preferably formed of stainless steel) positioned adjacent a surface 108 of the support structure 23. As shown in these figures, the surface 108 is located in a shallow recess, however, the planar surface 106 may be utilized in the practice of this embodiment, as well as a recessed surface. In the practice of this embodiment, a laser beam is used to melt a portion of the finger 100 to bond finger 100 to the structure 23, indicated by distorted portion 101.

Figure 23:
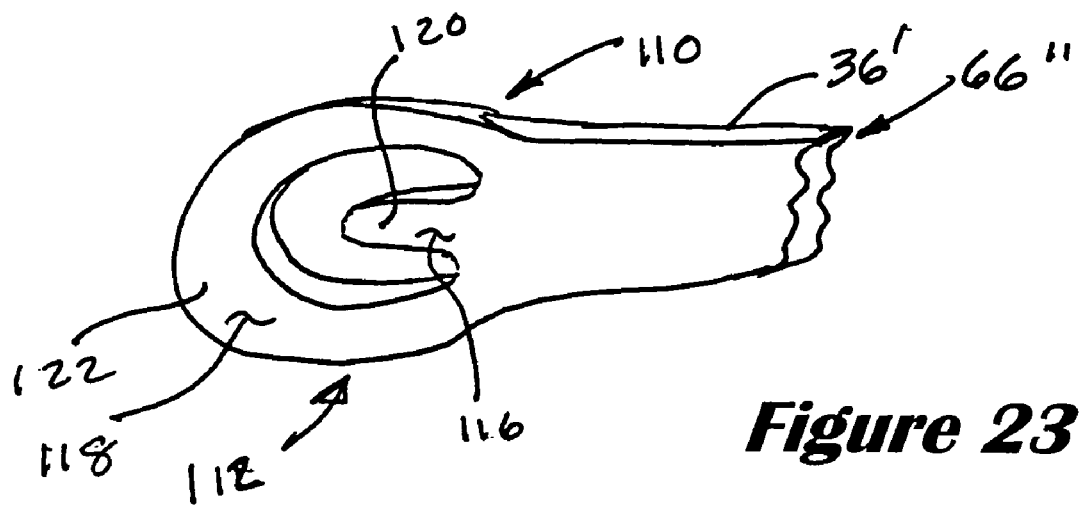
FIG. 23 is a fragmentary view of a clip formed at an end of a stainless steel layer of the flexure useful in an eleventh embodiment of the present invention.
Figure 24:
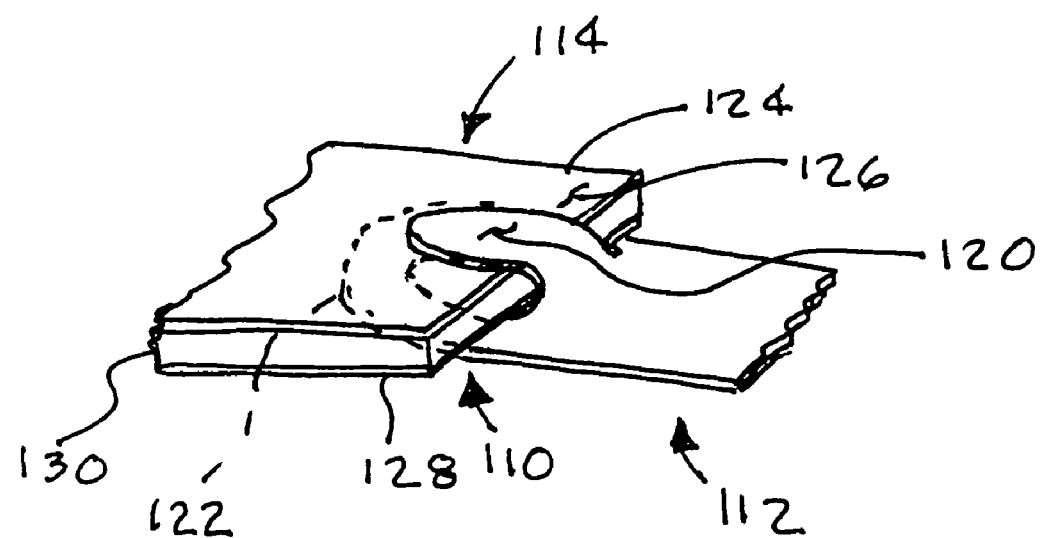
FIG. 24 is a fragmentary perspective view of a printed circuit board of the type which would carry a preamplifier, showing connection to the clip of FIG. 23 in the practice of the eleventh embodiment of the present invention.

FIGS. 23 and 24 show an eleventh embodiment of the present invention wherein a clip 110 is formed on an end 112 of a stainless steel layer 36' of a flexure 66" to provide an immediate and direct connection to a printed circuit board 114 of a preamplifier (not shown). Clip 110 preferably has a first grasping member 116 and a second grasping member 118. In this variation, first member 116 is a tongue 120, and second member 118 is a ring 122. As may be seen most clearly in FIG. 24, the tongue 120 is displaced out of plane with the ring 122 so that the printed circuit board 114 (with an appropriate ground connection 126) will be in mechanical and electrical contact with clip 110 when the clip 110 is installed on the printed circuit board 114.

Figure 25:
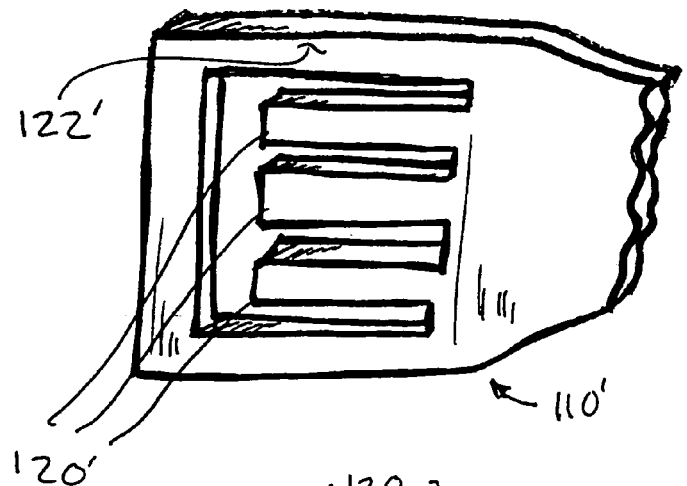
FIG. 25 is an alternative clip design useful in the practice of the eleventh embodiment of the present invention.

FIG. 25 is a first variation of the eleventh embodiment with multiple tongues 120' and a rectangular member 122' for a clip 110'. In this variation, member 122' is positioned on one side of the printed circuit board 114, while one or more of the tongues 120' are positioned on the other side.

Figure 26:
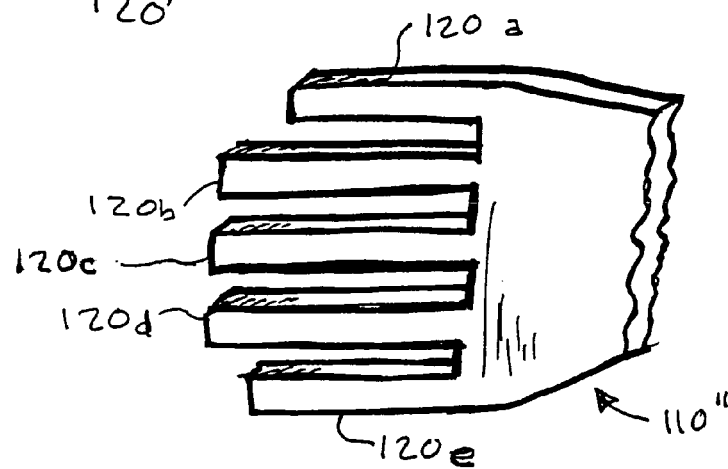
FIG. 26 is another alternative clip design useful in the practice of the eleventh embodiment of the present invention.

FIG. 26 is a second variation of the eleventh embodiment with only projecting elements 120a–120e for a clip 110". In the first and second variations, it is to be understood that some projecting elements are to be located on one side of the printed circuit board, while other ones of the projecting elements are to be located on the other side of the printed circuit board.

Figure 27:
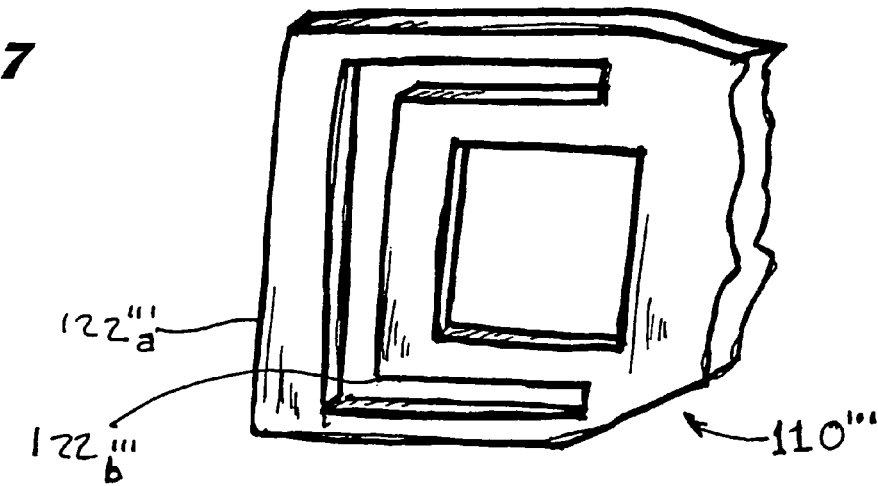
FIG. 27 is still another alternative clip design useful in the practice of the eleventh embodiment of the present invention.

FIG. 27 is a third variation of the eleventh embodiment with two closed loop, generally rectangular members, 122'''a and 122''' forming clip 110'''. In this variation, one of the rectangular members is placed on one side of the printed circuit board, and the other rectangular member is placed in contact with the other side of the printed circuit board, where it is to be understood that one or more grounding connections are made the printed circuit board to complete a grounding path from the head suspension assembly to the preamplifier circuit on the printed circuit board. It is to be further understood that in the first and second variations, one or more elements 120' or one of 120a–e may be connected to the support structure, if desired. In the embodiments shown in FIGS. 24–28, it is to be understood that the invention includes an apparatus for reducing interference in a head suspension assembly of the type having a flexure with a metal substrate layer mounted on a support structure in the form of an actuator arm or an E block, with a printed circuit board carrying a preamplifier and mounted on the support structure. More specifically, the apparatus of these embodiments includes a first ground connection on the printed circuit board closely adjacent the preamplifier and a second ground connection formed in the metal substrate layer of the flexure, with the first and second ground connections mechanically and electrically connected together at the printed circuit board closely adjacent the preamplifier. The first ground connection includes a portion of a conductive layer 124 on the printed circuit board 114, and the second ground connection includes a clip (which may take any of the forms shown in FIGS. 23, 25, 26 or 27). The clip is formed from the metal substrate layer and has at least two projections, with the printed circuit board located between the projections. The printed circuit board 114 may have a second conductive layer 128 in contact with at least one of the projections of the clip to make the ground connection close to the preamplifier or other wiring, which may include a write driver, for example. The projections may be formed as fingers, or may be in the form of one or more closed peripheral members, each of which may take various shapes such as a ring, or a rectangular member having an open medial region.

This invention is not to be taken as limited to all of the details thereof as modifications and variations thereof may be made without departing from the spirit or scope of the invention. By way of example, and not limitation, it is to be understood that any of the embodiments shown herein solely in connection with the E block may be used with an actuator arm, as well.

What is claimed is:

1. Apparatus for reducing ground loop interference in a head suspension assembly using a flexure with a metal substrate layer mounted on a moving support having a planar surface region and having wiring thereon, the apparatus comprising a first ground connection on the moving support closely adjacent the wiring and formed by a mechanical structure extending out of the planar surface region and a second ground connection formed in the metal substrate layer, and wherein the first and second ground connections are mechanically interengaged out of the planar surface region and electrically connected together.

2. The apparatus of claim 1 wherein the moving support is an actuator arm.

3. The apparatus of claim 1 wherein the moving support is an E block.

4. The apparatus of claim 1 wherein the wiring further comprises a preamplifier.

5. The apparatus of claim 1 wherein the wiring further comprises a flexible circuit.

6. The apparatus of claim 1 wherein the first ground connection comprises a slot in the moving support, and the second ground connection comprises a finger extending from the metal substrate layer, and the finger is received in the slot.

7. The apparatus of claim 6 wherein the finger is mechanically retained in the slot by spring force in the metal layer.

8. The apparatus of claim 1 wherein the first ground connection comprises a pin projecting from the moving support and the second ground connection comprises a region in the metal substrate layer having an aperture therethrough and sized to have an interference fit with the pin, and the aperture is received over the pin.

9. The apparatus of claim 8 wherein the aperture further comprises a plurality of radially inwardly directed projections.

10. The apparatus of claim 1 wherein the first ground connection comprises a region adjacent the wiring on the moving support, and the second ground connection comprises a surface on the metal substrate layer, wherein a conductive adhesive layer is located therebetween to mechanically and electrically connect the metal substrate layer and the moving support adjacent the wiring.

11. The apparatus of claim 10 wherein the conductive adhesive layer further comprises a strip.

12. The apparatus of claim 10 wherein the conductive adhesive layer further comprises a film.

13. The apparatus of claim 1 wherein the first ground connection comprises a printed circuit ground connection adjacent a preamplifier, and the second ground connection comprises a solder connection in the metal substrate layer.

14. The apparatus of claim 13 wherein the solder connection further comprises a ring.

15. The apparatus of claim 14 wherein the ring further comprises an aperture therein with a finger projecting into the aperture.

16. A method of connecting a ground between a flexure having a metal substrate layer and a moving support having a planar surface region and having a preamplifier mounted thereon comprising the steps of:
  a. forming a first ground connection as a mechanical structure extending out of the planar surface region of the moving support adjacent the preamplifier;
  b. forming a second ground connection in the metal substrate layer; and
  c. securing the first and second ground connections together at the mechanical structure and out of the planar surface region to ground the flexure close to the preamplifier.

17. The method of claim 16 wherein the moving support is an actuator arm.

18. The method of claim 16 wherein the moving support is an E block.

19. The method of claim 16 wherein the step of forming a first ground connection includes forming a recess in the moving support adjacent the preamplifier and further wherein the step of forming a second ground connection includes forming a projection in the metal substrate layer; and the step of securing the first and second ground connections includes capturing the projection in the recess.

20. The method of claim 19 wherein the step of securing the first and second ground connections together includes retaining the second ground connection by a spring action.

21. The method of claim 19 wherein the step of securing the first and second ground connections together includes retaining the second ground connection by deforming the metal substrate layer at least partially within an elastic range.

22. The method of claim 16 wherein the step of forming the first ground connection includes forming a groove in the moving support and the step of forming the second ground connection includes forming a finger projecting from the metal substrate layer and the step of securing the first and second ground connections together includes receiving the finger in the groove.

23. The method of claim 16 wherein the step of forming the first ground connection includes providing a pin projecting from the moving support adjacent the preamplifier and the step of forming the second ground connection includes forming an aperture in the metal substrate layer, and the step of securing the first and second ground connections together includes receiving the aperture over the pin in an interference fit.

24. The method of claim 23 wherein the metal spring layer has a plurality of radially inwardly extending projections and the step of securing the first and second ground connections together further includes resiliently deforming the projections as the aperture is received over the pin.

25. The method of claim 16 wherein the step of securing the first and second ground connections together includes adhering the metal substrate layer to the moving support with a conductive adhesive layer.

26. The method of claim 25 wherein the conductive adhesive layer further comprises a strip.

27. The method of claim 25 wherein the conductive adhesive layer further comprises a film.

28. The method of claim 16 wherein the step of forming the first ground connection includes forming a printed circuit connection adjacent the preamplifier and the step of forming the second ground connection includes forming a solder connection in the metal substrate layer, and the step of securing the first and second ground connections together includes soldering the solder connection to the printed circuit connection.

29. The method of claim 28 wherein the solder connection comprises a ring.

30. The method of claim 29 wherein the ring further comprises an aperture and a finger projecting into the aperture.

31. Apparatus for reducing interference in a head suspension assembly of the type having a flexure with a metal substrate layer mounted on a moving support having a planar surface region, with a write driver mounted on the moving support, the apparatus comprising a first ground connection formed by a mechanical structure extending out of the planar surface region on the moving support closely adjacent the write driver and a second ground connection formed in the metal substrate layer of the flexure closely adjacent the first ground connection, wherein the first and second ground connections are mechanically interengaged out of the planar surface region and electrically connected together.

32. The apparatus of claim 31 wherein the moving support is an actuator arm.

33. The apparatus of claim 31 wherein the moving support is an E block.

34. The apparatus of claim 31 wherein the first ground connection comprises a partially closed cavity in the moving support and the second ground connection comprises a portion of the metal substrate layer bent to form a spring-like member adapted to be received and retained in the partially closed cavity such that the first and second ground connections are mechanically and electrically connected together when the spring-like member is received in the cavity.

35. The apparatus of claim 31 wherein the first ground connection comprises a opening in the moving support, and the second ground connection comprises a rim of an aperture in the metal substrate layer and the mechanical and electrical connection between the first and second ground connections is formed by a pin received through the aperture which deforms the rim of the aperture and urges it against the opening in the moving support.

36. The apparatus of claim 35 wherein the opening comprises a bore having a circular cross section.

37. The apparatus of claim 35 wherein the aperture further comprises a circular cross section.

38. The apparatus of claim 35 wherein the aperture further comprises a plurality of radially inwardly directed tongues arranged around and extending from the rim, such that the tongues are deformed by the pin and retained by the pin against the bore.

39. The apparatus of claim 31 wherein the first ground connection comprises an opening formed as at least one slot extending into the moving support, and the second ground connection comprises an aperture in the metal substrate layer having at least one tongue extending into the slot mechanically and electrically connecting the metal substrate layer to the moving support.

40. The apparatus of claim 39 wherein the opening further comprises a cruciform cross section, and the aperture comprises a corresponding cruciform cross section with a plurality of arms and at least one tongue extending from each arm in contact with the moving support.

41. The apparatus of claim 31 wherein the first ground connection comprises a trough-shaped opening in the moving support having an overhanging edge, and the second ground connection comprises a finger extending into the trough and retained by the overhanging edge such that the first and second ground connections are mechanically and electrically connected together.

42. The apparatus of claim 41 wherein the overhanging edge is deformed to retain the finger.

43. The apparatus of claim 41 wherein the trough-shaped opening is formed below a generally planar surface of the moving support, and the overhanging edge projects over the trough-shaped opening and below the planar surface.

44. The apparatus of claim 41 wherein the trough-shaped opening is formed below a generally planar surface of the moving support, and the overhanging edge projects over the trough-shaped opening and above the planar surface.

45. The apparatus of claim 44 wherein the overhanging edge is deformed to retain the finger.

46. The apparatus of claim 31 wherein the first ground connection comprises a surface of the moving support, and the second ground connection comprises a finger extending adjacent the surface and further wherein the finger is mechanically and electrically secured to the moving support by a laser melted region in the finger and surface.

47. The apparatus of claim 46 wherein the surface of the moving support further comprises a shallow recess in which the finger is received.

* * * * *